Figure 1:
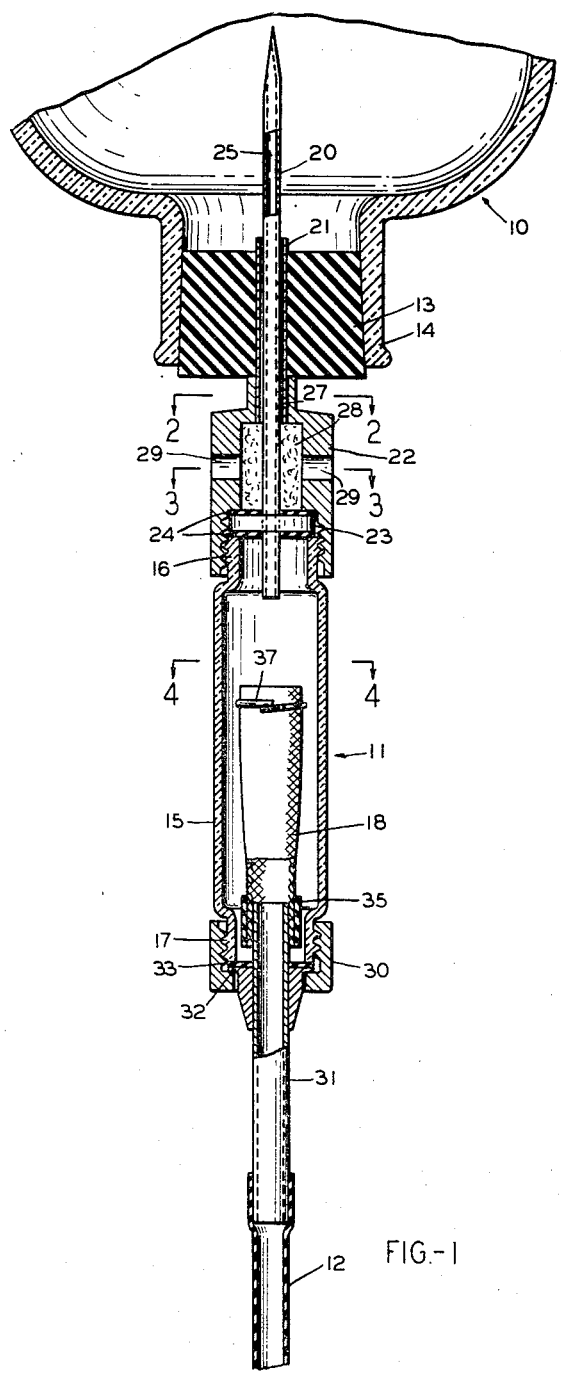

June 14, 1949.  R. K. LAGER  2,473,153
BLOOD FILTER
Filed Aug. 22, 1947

INVENTOR
ROGER K. LAGER
BY
Hyde, Meyer, Baldwin & Doran
ATTORNEYS

Patented June 14, 1949

2,473,153

UNITED STATES PATENT OFFICE 2,473,153

BLOOD FILTER

Roger K. Lager, Lakewood, Ohio, assignor to The Continental Pharmacal Company, Cleveland, Ohio, a corporation of Ohio Application August 22, 1947, Serial No. 770,074

6 Claims. (Cl. 210—170)

1

The invention relates to a novel and improved blood filter for removing any solid particles, but usually blood clots, from previously stored whole blood which is being administered to a patient.

An object of the invention is to provide a filter of the character indicated, which removes unwanted particles without blocking the filter or interrupting the blood flow.

A further object of the invention is to provide a blood filter wherein the actual filtering medium is a novel textile fabric of exceptionally suitable properties for its intended purpose.

A further object of the invention is to provide a filter unit having blood intake and discharge portions, the said intake portion comprising novel and improved double needle means adapted to pierce a container cork or wall so as to permit blood to flow outwardly through one needle passage while permitting air to enter the container through another needle passage, there being air filter means in a portion of the second needle passage for filtering the incoming air.

A further object of the invention is to provide a filter unit of the character described in the last preceding paragraph, wherein the blood discharge portion is provided with novel blood filtering means for the removal of unwanted particles from the blood stream being administered to a patient.

A further object of the invention is to provide novel means for the removal of blood clots from stored blood about to be administered to a patient, said means consisting of a filter unit including an intake portion provided with a novel, elongated needle adapted to pierce a blood container and to extend materially above the container bottom, novel air filter means associated with said needle for venting filtered air to the blood container, and novel blood filter means for filtering the blood received through the needle, and delivering clot-free blood to an administration tube for tranfusion purposes.

Other objects and advantages, including further novel features of the invention will be apparent from this specification and the accompanying drawings, and the essential features thereof will be set forth in the appended claims.

In the drawings,

Fig. 1 is a longitudinal sectional view showing a fragmentary portion of a stored blood container, a blood filter and air vent filter, and a fragmentary portion of a blood delivery tube.

Figure 2:
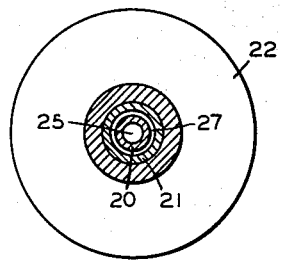
Figure 3:
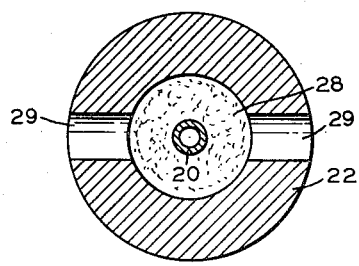
Figure 4:
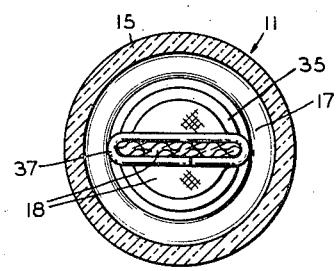

Figs. 2, 3 and 4 are enlarged sectional views taken respectively on the lines 2—2, 3—3 and 4—4 of Fig. 1.

2

As is well known to those skilled in the medical arts, the administration of stored blood to a patient is a procedure requiring a high degree of skill and care, so that every eventuality should be anticipated and adequately provided for. The stored whole blood should be carefully filtered for the removal of included solid or semi solid particles of any nature, whether accidentally picked up in handling or formed by clotting or coagulation of the blood itself. Such particles, of whatever nature, can be quite harmful if injected into the blood stream of a patient.

Various types of blood filters have heretofore been used in attempts to solve the above problem. They have not been entirely satisfactory, particularly in the matter of proper air venting, and prevention of stream stoppage by accumulation of particles on the blood filter surface or by inadequate operation of the air vent.

As will appear, the present invention is particularly designed and constructed to avoid the disadvantages mentioned in the last preceding paragraph.

Referring now to the drawings, and particularly to Fig. 1, there is shown a whole blood container 10, which discharges by gravity to and through a filter unit 11 to a delivery tube 12. The container 10 may be of any suitable size and shape, and is usually provided with a perforatable bottom wall portion which in the illustrated embodiment of the invention is indicated as a stopper 13 which closes the neck 14 of the container.

The filter unit 11 is provided with intake and discharge ports, shown respectively at the upper and lower ends of the unit in the operating position of Fig. 1. The unit has a tubular body 15, having end openings defined by the upper and lower necks 16 and 17 respectively. As will more fully appear, the body houses the blood filter 18 near the discharge end, and carries an air filter, air vent means, and blood intake means at the intake end.

The air vent filter and blood intake means will first be described. They comprise a double needle consisting of an inner tubular member 20, and, concentric therewith, an outer tubular sleeve 21. The sleeve 21 is fixedly attached in a screw cap 22 which retains the needle assembly on the neck 16. The inner member 20 is pointed at its tip, and near its lower end is provided with an annular flange 23 which is gripped between the screw cap 22 and the neck 16. Upper and lower sealing gaskets 24 prevent blood leakage, or intercommunication between the blood flow and the air vent flow to be described in the next succeeding paragraph. Blood flow of course proceeds through passage 25 in the inner needle element 20.

As previously indicated, the sleeve portion 21 of the needle is radially spaced from the inner member 20 only just enough to permit air flow, but prevent blood flow. The annular passage 27 between outer and inner needle members opens at its top end into the blood container 10, and at its bottom end into a cap chamber 28 which is filled with filtering material, such as cotton or the like, and which communicates with atmosphere through holes 29. It will now be apparent that as blood flows downwardly through passage 25 in the inner needle element 20, air to replace the blood enters holes 29 in cap 22, passes through filter material in the cap chamber 28, proceeds upwardly through the annular passage 27, and bubbles through the blood in container 10. The air filter material may be replaced upon removal of the cap, whereupon needle 20 can be lifted out of the cap.

A distinct advantage of the structure just described is that the inner element 20 constituting the actual blood-receiving needle is long enough to extend upwardly a substantial distance above the inner bottom wall of the container 10, so that any blood clots or other particles of substantial size do not block inward blood flow into the needle, but settle to the container bottom below the needle intake. Air vent flow of course proceeds upwardly, and can displace particles which might otherwise block the upper entrance to passage 27.

The discharge end of the blood filter unit, including the filter 18 for the blood stream will now be described.

A centrally perforated screw cap 30 is provided for the lower threaded neck 17 of body 15. An outlet tube 31, preferably of aluminum, is removably supported in cap 30 by means of a shouldered portion 32 on a bushing affixed to an intermediate portion thereof. The upper end of the outlet tube 31 extends upwardly into body 11, and its lower end extends downwardly through cap 30, and outwardly from the filter unit. The shouldered flange 32 and a sealing gasket 33 are gripped between the cap 30 and the neck 17.

The actual blood filter 18 is an elongated sack, pocket, or tube of woven material having a closed top and an open bottom neck which is telescopingly fitted over the upper end of tube 31, and is secured thereto, for example by the ring 35 of resilient or rubberlike material. It may be noted that the blood flow is downwardly and inwardly into the filter sack, and thence outwardly through tube 31. Blocking of the filter sack is prevented by reason of the fact that particles settle downwardly from the outer sack wall, and since the filter is disassembled and cleaned after each blood administration, there is no conceivable chance of blocking the blood flow.

A preferred material for the filter sack is woven from an organic plastic thread or fiber available commercially under the trade name "Saran." This plastic is essentially vinylidine chloride. It is available in woven tubular braid form, and can be cut off into suitable lengths, one end fitting over tube 31, as aforesaid, and the other end being flattened and sealed under a securing clip 37, of Monel metal or the like.

The intake and discharge ends of the filter unit, including the blood filter, air vent, and air filter, all cooperate to assure a continuous flow of blood until the desired amount has been administered.

What I claim is:

1. Blood intake means for a blood filter unit of the character described, wherein blood from a storage container is admitted to a hollow body, is filtered therein, and is then discharged therefrom, said intake means comprising a cap member adapted for application to an intake port wall on said body, a needle supported in said cap and having a portion extending within said body and another portion extending outwardly from said body and adapted to penetrate a blood container closure, said needle having an axial passage completely therethrough, a tubular sleeve extending through said cap, concentric with said needle but spaced radially outwardly therearound to provide an annular air vent passage of restricted area so as to prevent blood flow therethrough, the upper end of said sleeve being extendable into said container but short of the upper end of said needle, the lower end of said sleeve communicating with the inner portion of said cap, the wall of said cap outwardly beyond said intake port wall having an air vent aperture communicating through said cap with said annular passage, and air filter means in said cap in the path of the air flow.

2. A blood filter unit of the character described comprising a hollow body having a blood intake port therein, a wall surrounding and defining said port, a cap having a depending peripheral flange adapted for attachment to said wall, an elongated needle passing through a central aperture in said cap and having an inner portion extending through said port into said body and an outer portion extending outwardly beyond said cap and adapted to pierce a closure portion of a blood container, said needle being provided with a blood flow passage extending completely longitudinally therethrough, transverse partition means within said cap and surrounding said needle to define a chamber in said cap out of communication with said body and said needle, a tubular sleeve surrounding part of the outer portion of said needle and spaced radially outwardly therefrom to provide an annular passage of restricted area whereby to prevent blood flow therethrough, the inner end of said sleeve extending through said aperture in said cap whereby to establish air flow communication with said chamber, the outer end of said sleeve stopping somewhat short of the outer tip of said needle but being likewise adapted to pierce said blood container closure, the cap portion constituting the outer chamber wall being provided with a vent opening whereby to permit outer air to flow into said chamber and then through said annular passage, and air filter means in said chamber in the path of said air flow.

3. A blood filter unit of the character described comprising a hollow body having a blood intake port therein, a wall surrounding and defining said port, a cap having a depending peripheral flange adapted for attachment to said wall, an elongated needle passing through a central aperture in said cap and having an inner portion extending through said port into said body and an outer portion extending outwardly beyond said cap and adapted to pierce a closure portion of a blood container, said needle being provided with a blood flow passage extending completely longitudinally therethrough, transverse partition means within said cap and surrounding said needle to define a chamber in said cap out of communication with said body and said needle, said partition being of annular flange character and being affixed to said needle, a tubular sleeve surrounding part of the outer portion of said needle and spaced radially outwardly therefrom to provide an annular passage, the inner end of said sleeve extending through said aperture in said cap whereby to permit outer air to flow into said chamber and then through said annular passage, and air filter means in said chamber in the path of said air flow.

4. A blood filter unit of the character described comprising a hollow body provided with blood inlet means consisting of a needle adapted to penetrate a blood container closure and to extend a substantial distance into said container beyond the inner wall of said closure, said needle having a passage therethrough to permit blood flow between said container and said body, said body being further provided with blood discharge means including an outlet tube having one end extending into said body, and a filter sack of woven material embracing and supported by the inner end of said outlet tube, whereby blood flow through said unit proceeds from said needle through said body and inwardly through said sack wall to said outlet tube, and whereby blood clots and similar particles in the blood stream settle by gravity from the outer surface of said sack to the lowermost portion of said body without blocking blood flow through said unit.

5. A blood filter unit of the character described comprising a hollow tubular body provided with a blood intake port at one end and with a blood discharge port at its other end, a wall of said body surrounding said intake port, a cap having a depending peripheral flange adapted for attachment to said wall, an elongated needle passing through a central aperture in said cap and having an inner portion extending through said intake port into said body and an outer portion extending outwardly beyond said cap and adapted to pierce a closure portion of a blood container, said needle being provided with a blood flow passage extending completely longitudinally therethrough, transverse partition means within said cap and surrounding said needle to define a chamber in said cap out of communication with said body and said needle, a tubular sleeve surrounding part of the outer portion of said needle, and spaced radially outwardly therefrom to provide an annular passage, the inner end of said sleeve extending through said aperture in said cap whereby to establish air flow communication with said chamber, the outer end of said sleeve stopping somewhat short of the outer tip of said needle but being likewise adapted to pierce said blood container closure, the cap portion constituting the outer chamber wall being provided with a vent opening whereby to permit outer air to flow into said chamber and then through said annular passage, air filter means in said chamber in the path of said air flow, an outlet port closure, a blood outlet tube passing through said last named closure for the discharge of blood from said tubular body, said outlet tube having a portion extending inwardly into said body, a filter sack of woven material having a neck portion telescopingly applied to the inner end of said outlet tube whereby blood flow from said body passes from said body through said sack and thence outwardly through said outlet tube, and means for maintaining the sack substantially above the bottom of the tubular body when in normal operating position, whereby clots in the blood stream are intercepted by the outer surface of the sack, and settle by gravity to the bottom of the receptacle.

6. Blood intake means for a blood filter unit of the character described, wherein blood from a storage container is admitted to a hollow body, is filtered therein, and is then discharged therefrom, said intake means comprising a cap member adapted for application to an intake port wall on said body, a needle supported in said cap and having a portion extending within said body and another portion extending outwardly from said body and adapted to penetrate a blood container closure, said needle having an axial passage completely therethrough, a tubular sleeve extending through said cap, concentric with said needle but spaced radially outwardly therearound to provide an annular air vent passage of restricted area so as to prevent blood flow therethrough, the upper end of said sleeve being extendable into said container but short of the upper end of said needle, the lower end of said sleeve communicating with the inner portion of said cap and the wall of said cap outwardly beyond said intake port wall having an air vent aperture communicating through said cap with said annular passage.

ROGER K. LAGER.

REFERENCES CITED

The following references are of record in the file of this patent:

UNITED STATES PATENTS

| Number | Name | Date |
|---|---|---|
| 1,199,628 | Stauffer | Sept. 26, 1916 |
| 2,168,270 | Paisley et al. | Aug. 1, 1939 |
| 2,186,987 | Nesset | Jan. 16, 1940 |
| 2,212,318 | Gee | Aug. 20, 1940 |
| 2,222,123 | Schwab | Nov. 19, 1940 |
| 2,231,564 | Cooksey | Feb. 11, 1941 |
| 2,338,610 | Wiley | Jan. 4, 1944 |
| 2,416,391 | Hixon | Feb. 25, 1947 |
| 2,435,820 | Diggs | Feb. 10, 1948 |